United States Patent
Frey, Sr. et al.

(10) Patent No.: US 11,505,369 B2
(45) Date of Patent: Nov. 22, 2022

(54) TACK WELDED FIN SEAL

(71) Applicant: NORDSON CORPORATION, Westlake, OH (US)

(72) Inventors: Charles M. Frey, Sr., Groton, CT (US); Lynn Frazier, Webster, MA (US); Henry Delgado, Putnam, CT (US); Robert W. Springhorn, Cream Ridge, NJ (US)

(73) Assignee: Nordson Corporation, Westlake, OH (US)

( * ) Notice: Subject to any disclaimer, the term of this patent is extended or adjusted under 35 U.S.C. 154(b) by 324 days.

(21) Appl. No.: 16/976,889

(22) PCT Filed: Feb. 28, 2019

(86) PCT No.: PCT/US2019/020042
§ 371 (c)(1),
(2) Date: Aug. 31, 2020

(87) PCT Pub. No.: WO2019/169126
PCT Pub. Date: Sep. 6, 2019

(65) Prior Publication Data
US 2021/0039836 A1 Feb. 11, 2021

Related U.S. Application Data

(60) Provisional application No. 62/637,269, filed on Mar. 1, 2018.

(51) Int. Cl.
*B65D 35/08* (2006.01)
*B65D 35/24* (2006.01)
(Continued)

(52) U.S. Cl.
CPC ............. *B65D 35/08* (2013.01); *B65D 35/24* (2013.01); *B65D 35/44* (2013.01); *F16B 5/08* (2013.01)

(58) Field of Classification Search
CPC ........ B65D 35/08; B65D 35/24; B65D 35/44; B65D 35/00; B65D 35/04; B65D 35/10; B65D 35/247; F16B 5/08; F16B 5/00
(Continued)

(56) References Cited

U.S. PATENT DOCUMENTS

| 7,261,468 B2 | 8/2007 | Schneider et al. |
| 9,579,686 B2 | 2/2017 | Springhorn |

(Continued)

FOREIGN PATENT DOCUMENTS

| CN | 1668507 A | 9/2005 |
| CN | 103786957 A | 5/2014 |

(Continued)

*Primary Examiner* — David J Walczak
(74) *Attorney, Agent, or Firm* — BakerHostetler

(57) ABSTRACT

Systems and methods of a container having a tack welded fin seal. The container may include a film, a tack weld joining a first outer portion of a first edge and a second outer portion of the first edge, and a fin seal joining a first inner portion of the first edge of the film and a second inner portion of a second edge of the film. The container may include a faceplate integrally molded to an outer layer of a first end portion of the film. The faceplate may include substantially the same composition as an outer layer of the first end portion, such that no distinct layers are formed between the faceplate and the film. The tack weld may be formed at a tack welding system, and the fin seal may be formed at a fin sealing system having a mandrel.

14 Claims, 9 Drawing Sheets

(51) Int. Cl.
*B65D 35/44* (2006.01)
*F16B 5/08* (2006.01)

(58) Field of Classification Search
USPC .............. 215/12.1, 12.2, 372, 373, 379, 381
See application file for complete search history.

(56) References Cited

U.S. PATENT DOCUMENTS

| | | | |
|---|---|---|---|
| 2004/0105917 A1* | 6/2004 | Mannion | ............ B65D 81/3869 |
| | | | 426/110 |
| 2005/0265636 A1 | 12/2005 | Michalsky | |
| 2009/0120931 A1 | 5/2009 | Murray | |
| 2012/0058231 A1 | 3/2012 | Hätinger et al. | |
| 2014/0117041 A1 | 5/2014 | Springhorn | |
| 2017/0072426 A1 | 3/2017 | Frey | |
| 2017/0081074 A1* | 3/2017 | Lorbach | ................. B65D 47/06 |

FOREIGN PATENT DOCUMENTS

| | | |
|---|---|---|
| CN | 204137557 U | 2/2015 |
| EP | 2724789 A1 | 4/2014 |
| JP | 2014-201338 A | 10/2014 |
| WO | 02/00522 A1 | 1/2002 |
| WO | 02/40261 A1 | 5/2002 |
| WO | 2004/002835 A2 | 1/2004 |

\* cited by examiner

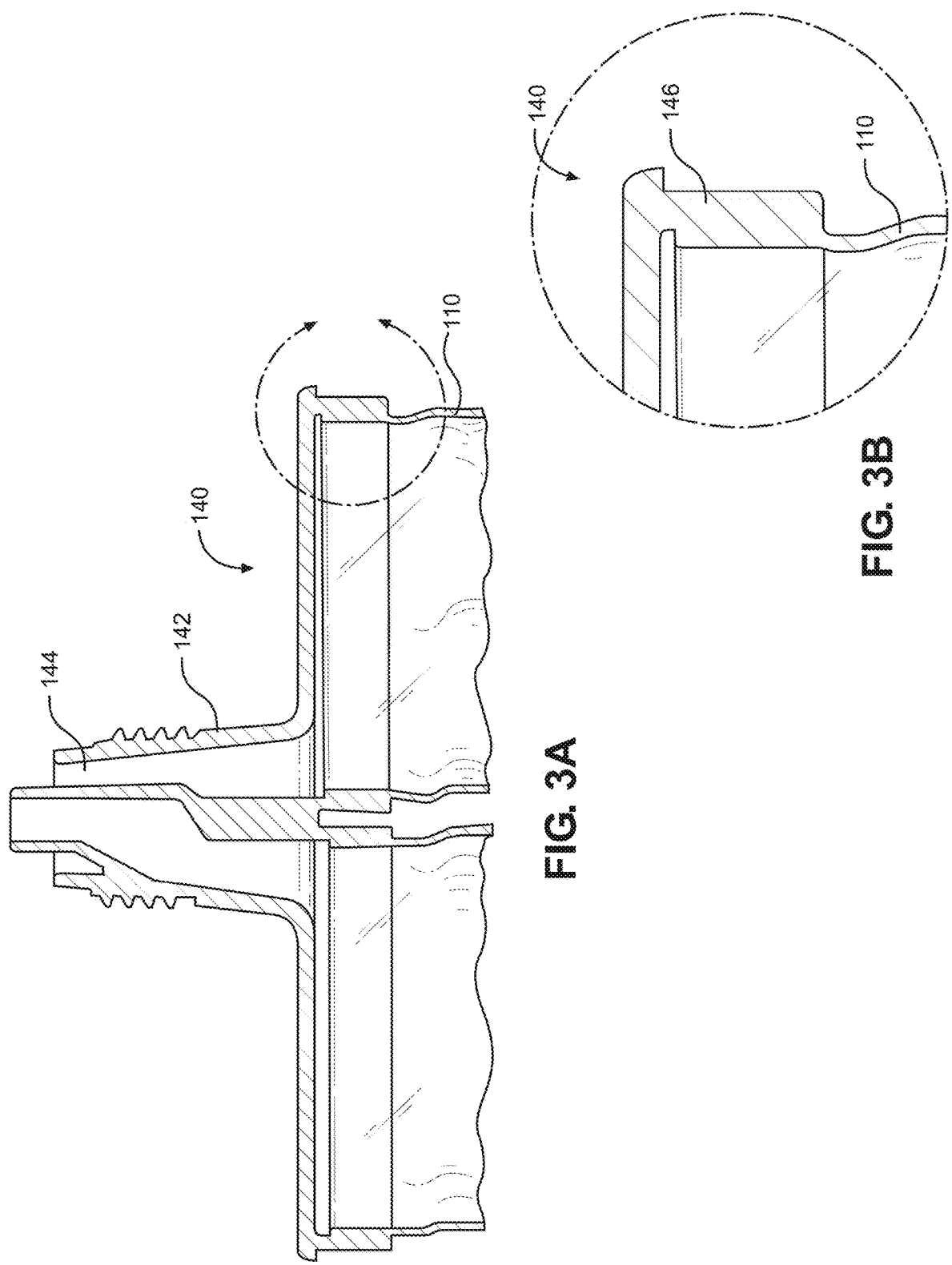

TACK WELDED FIN SEAL

CROSS REFERENCE TO RELATED APPLICATIONS

This application is a U.S. National Stage Application of International Patent App. No. PCT/US2019/020042, filed Feb. 28, 2019, which claims the benefit of U.S. Provisional Patent App. No. 62/637,269, filed Mar. 1, 2018, the entire disclosures of both of which are hereby incorporated by reference as if set forth in their entireties herein.

TECHNICAL FIELD

The present disclosure relates generally to containers, and systems and methods for producing such containers, and more particularly, to containers having a tack welded fin seal, and systems and methods for producing such containers.

BACKGROUND

Some containers are provided with a fin seal where interior surfaces are sealed together to create a fin, and then the fin is folded over. The fin seal is often used to produce pillow bags for potato chip bags or candy bar wrappers. The fin seal provides favorable sealing and handling properties for such applications. However, the present inventors have found that the current fin seal is not sufficient for other applications, such as when applying high internal pressures, sealing corrosive materials, and/or molding a faceplate onto the container.

SUMMARY

The foregoing needs are met, to a great extent, by the systems and methods described herein. In one aspect, a method is disclosed for producing a container having a film. The method includes folding a first outer portion of a first edge of the film over a second outer portion of the first edge of the film, and tack welding the first outer portion and the second outer portion. The method further includes positioning a second inner portion of a second edge over a first inner portion of the first edge, and sealing the first inner portion and the second inner portion to form a tack welded fin seal.

Another aspect is directed to a container. The container may include a film, a tack weld joining a first outer portion of a first edge and a second outer portion of the first edge, and a fin seal joining a first inner portion of the first edge of the film and a second inner portion of a second edge of the film.

Yet another aspect is directed to a container. The container may include a film having an inner layer, a center layer, and an outer layer, where each of the inner layer and the outer layer of a polymer, and the center layer of a metal. The container may include a tack weld joining a first outer portion of a first edge of the film and a second outer portion of the first edge. The container may further include a fin seal joining an inner portion of the first edge and an inner portion of a second edge of the film, where the tack weld extends substantially the entire length of the fin seal. The container may even further include a faceplate integrally molded to the outer layer of a first end portion of the film. The faceplate may have substantially the same composition as the outer layer of the first end portion, such that the outer layer and the faceplate form an integrated structure of essentially uniform composition having no distinct layers at a conjoined region of the integrated structure. The container may include a gusset seal on a second end portion of the film. An adhesive or an epoxy may be stored within the film.

BRIEF DESCRIPTION OF THE DRAWINGS

In order that the disclosure may be readily understood, aspects of this disclosure are illustrated by way of examples in the accompanying drawings.

FIGS. 3A-B illustrate an exemplary molded faceplate of the exemplary container of FIG. 1.

The same reference numbers reference the same parts in the drawings and the detailed description.

DETAILED DESCRIPTION

Systems and methods of sealing a container with a tack welded fin seal are described herein. The tack welded fin seal of the present invention is applicable to containers composed of laminated film as disclosed in U.S. Patent Application Publication No. 2017/0072426 and in U.S. Pat. No. 9,579,686, which are each expressly incorporated by reference in their entirety. The tack welded fin seal increases the strength of the joint, preventing breakage during processing and/or storage of the container. For example, the tack welded fin seal of the present invention prevents breakage of a fin seal during the molding process as disclosed in U.S. Publication No. 2017/0072426, often caused by the separation of laminate layers. Furthermore, in sealing the unmolded end of the film, the tack welded fin seal repositions the fin seal and increases seal quality. Even furthermore, during filling the container, the tack welded fin seal improves the internal pressure dynamics. In current fin seals, internal pressure can unfold the fin seal and create a pressure concentration at the fin seal by pushing the sealed surfaces apart, potentially breaking the seal. However, the tack welded fin seal increases the integrity of the fin seal, by ensuring that internal pressure is applied to the interior surface of the film. The internal pressure would therefore increase the strength of the seal by pushing the sealing surfaces in the same radial direction. The tack welded fin seal may further prevent material stored in the container from flowing between the sealed surface, that may reduce the longevity of the fin seal which is especially problematic when storing corrosive materials.

Figure 1:
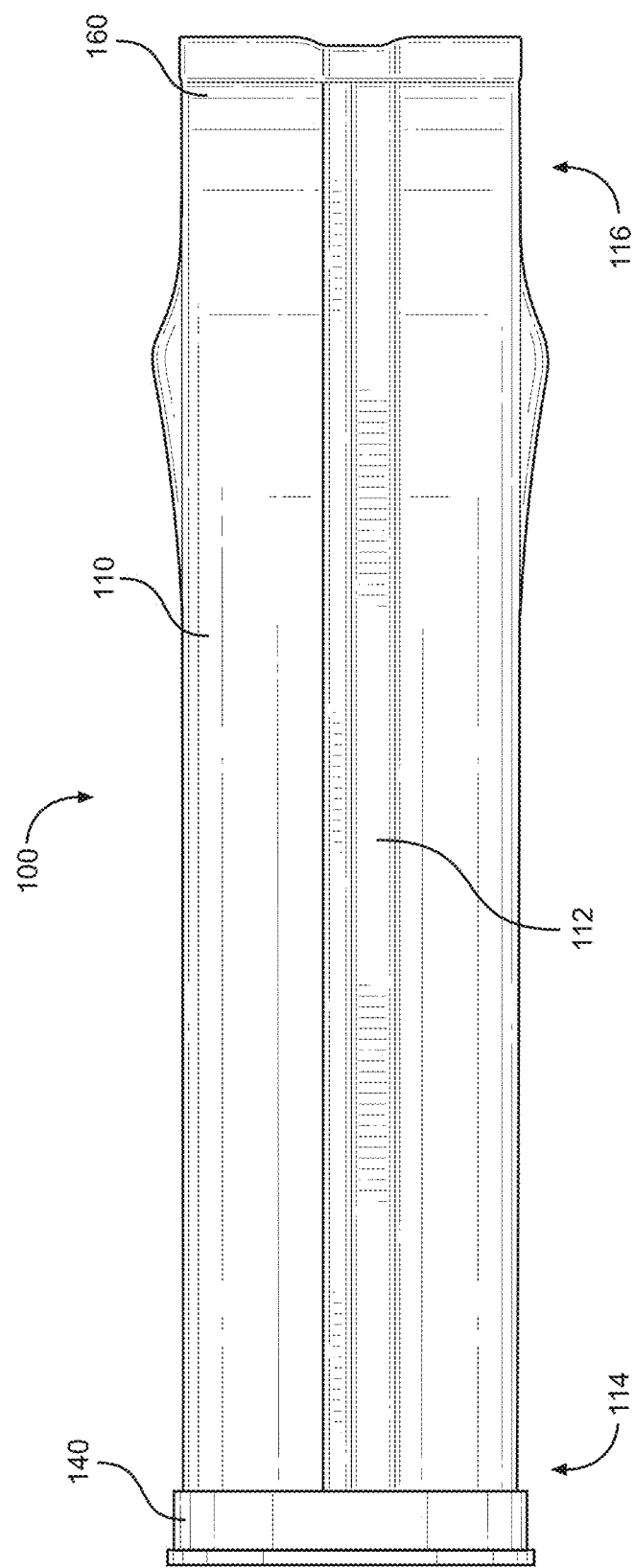
FIG. 1 illustrates an exemplary container comprising a tack welded fin seal.

FIG. 1 illustrates a container 100 having a flexible film 110 with a tack welded fin seal 112 along its length. As further illustrated, the container 100 may include a faceplate 140 molded to a first end portion 114 of the film 110 and a seal (e.g., a gusset seal) 160 on a second end portion 116 of the film 110. The container 100 may contain an adhesive or an epoxy enclosed by the film 110, the faceplate 140, and the gusset seal 160.

The film 110 may be composed of a homogenous film or a composite laminate of a plurality of layers with or without additives. The film 110 may comprise a polymer (e.g., polypropylene, polyethylene, nylon) and/or a metal (e.g., aluminum). For example, the film 110 may comprise a composite laminate having inner and outer layers of polypropylene and a center layer of aluminum foil. In a preferred embodiment, the outer layer of the film 110 may comprise the same or substantially the same composition(s) as a resin forming the faceplate 140. As used herein, the term "substantially the same" composition refers to resins of similar chemistry which will may intermix when molten producing a strong bond between the faceplate 140 and the outer layer of the film 110. For example, the outer layer of the film 110 and the resin may both be polypropylene compositions that intermix to form an integral structure without any distinct layers.

The tack welded fin seal 112 may be integrated into the molded faceplate 140 and lay flat along the gusset seal 160. The tack welded fin seal 112 may be structured to lay down flat, which makes the film more controllable for other operations (e.g., molding and/or weld), prevents delamination when filled, and/or homogenizes pressure.

Figure 2A:
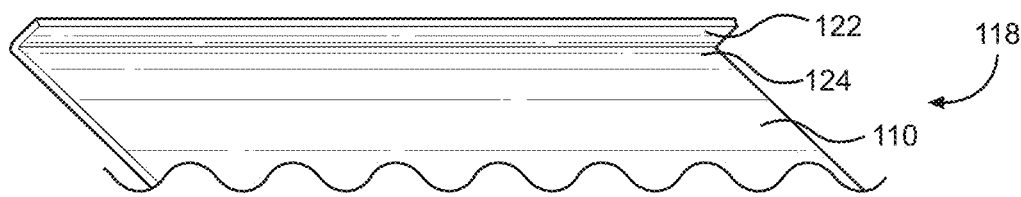
FIGS. 2A-D illustrate an exemplary method of forming the tack welded fin seal of FIG. 1.
Figure 2B:
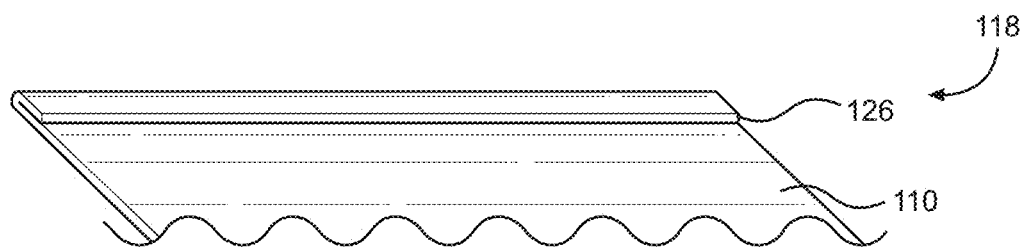
Figure 2C:
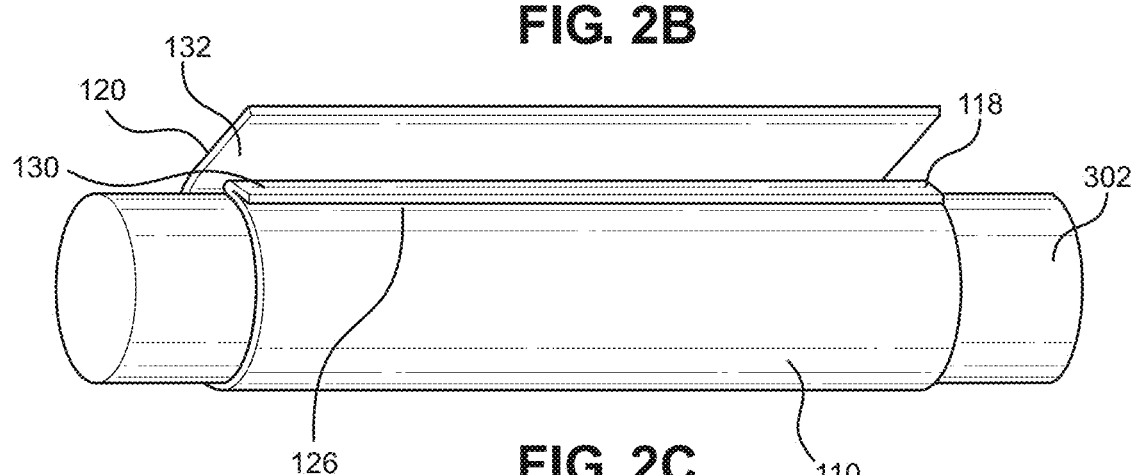
Figure 4:
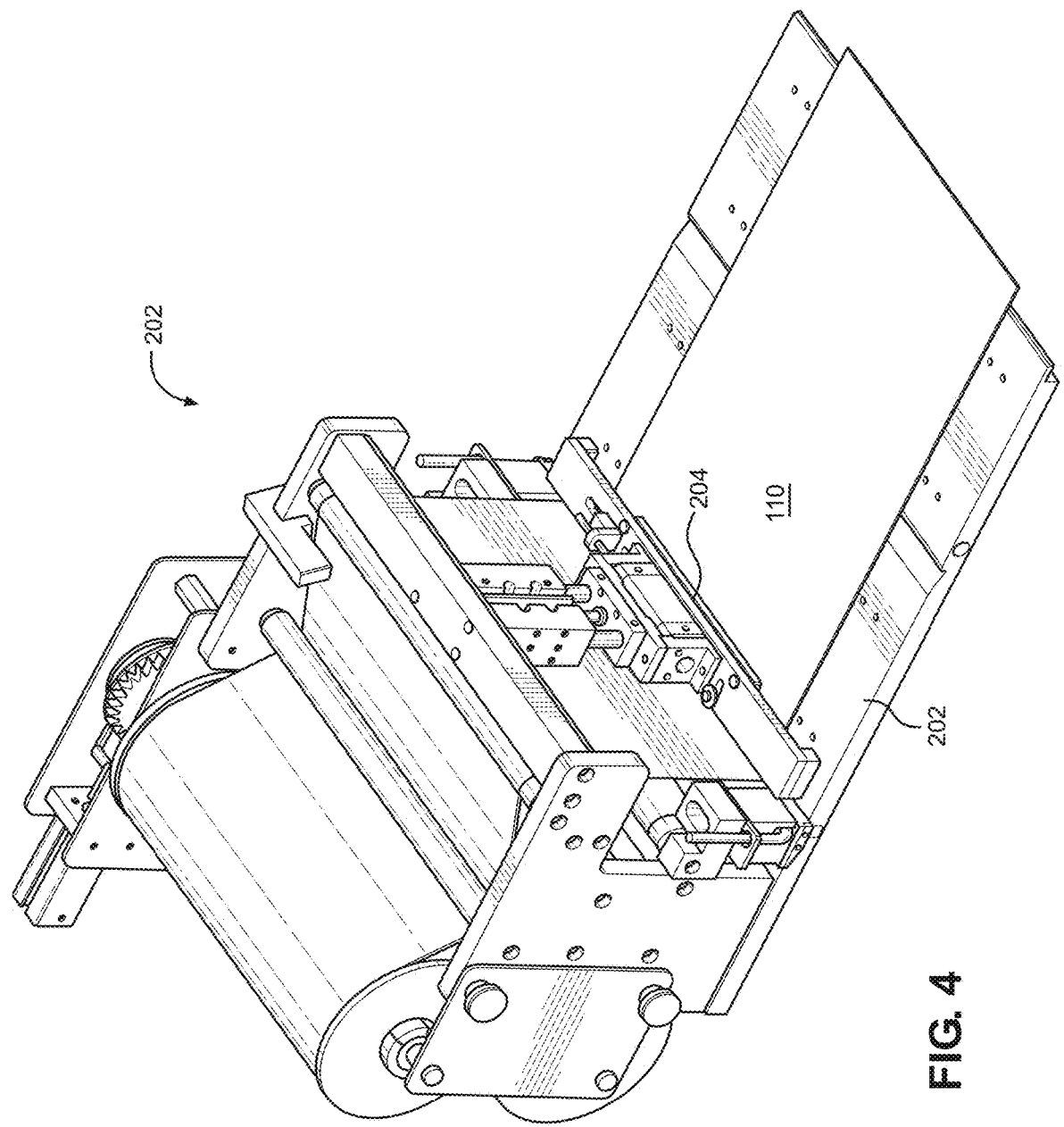
FIG. 4 illustrates an exemplary tack welding system configured to form the tack weld of FIGS. 1 and 2A-D.

FIGS. 2A-D illustrate a method of forming the tack welded fin seal 112 of the film 110. As illustrated in FIG. 2A, a first edge 118 of the film 110 may be folded. For example, a first outer portion 122 of the first edge 118 may be folded over a second outer portion 124 of the first edge 118, such that the first outer portion 122 and the second outer portion 124 may be in apposition. A tack weld 126 may then be applied to secure the first outer portion 122 and the second outer portion 124, as illustrated. The tack welded fin seal 134 may be formed when the film 110 is substantially flat and/or may be part of a larger sheet of film, as illustrated in FIG. 4. The film 110 may be mounted or wrapped on a mandrel 302 as illustrated in FIG. 2C. In some embodiments, the film 110 may be cut from the larger sheet of film prior to the mounting or wrapping.

Figure 2D:
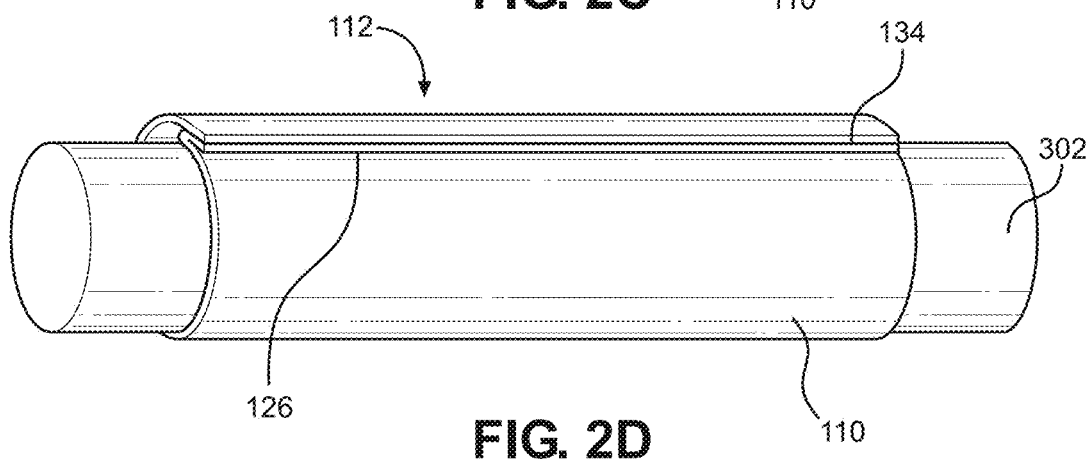

For example, the first edge 118 may be positioned on the mandrel 302, and a second edge 120 may be positioned over the first edge 118, such that a first inner portion 130 of the first edge 118 may oppose a second inner portion 132 of the second edge 120. The first edge 118 may then be secured to the second edge 120 through a fin seal 134 to form a tube of film 110, as illustrated in FIG. 2D. For example, the first inner portion 130 may be welded to the second inner portion 132 to form the tack welded fin seal 112. The tack welded fin seal 112 may secure together the second edge 120 with the two layers formed by the folded tack weld of the first edge 118. The first edge 118 may be either a short edge or a long edge of a rectangular sheet of the film 110, as further discussed below. In some embodiments, the film 110 may, additionally or alternatively, be cut after forming the tube of film 110 (e.g., when not cut prior to the mounting or wrapping).

FIGS. 3A-B illustrate a faceplate 140 of the container 100 of FIG. 1. As illustrated, the faceplate 140 may or may not include a nosepiece 142 extending from a first face and a flange 146 extending from a second face. The nosepiece 142 may include a discharge opening 144. The container 100 may further include a cap (not shown) releasable attachable to the nosepiece 142 with corresponding threads to releasably seal the discharge opening 144. The faceplate 140 may be formed through injection molding around the film 110. A resin forming the faceplate 140 may be injected in a molten state and melt an outer surface of the film 110. The resin may be the same or substantially the same composition as the outer surface of the film, and the outer surface of the film 110 and the flange 146 may intermix at an interface. The faceplate 140 and the outer layer of the film 110 may then solidify to form an integrated structure of essentially uniform composition having no distinct layers at the interface. The faceplate 140 may be molded to the circumference of the film 110, including the tack welded fin seal 112. The tack welded fin seal 112 without the tack weld 126 may be difficult to mold due a potential separation of the first and second edges 118, 120. The first and second edges 118, 120 may also separate after molding, potentially causing failure of the faceplate 140.

Figure 5:
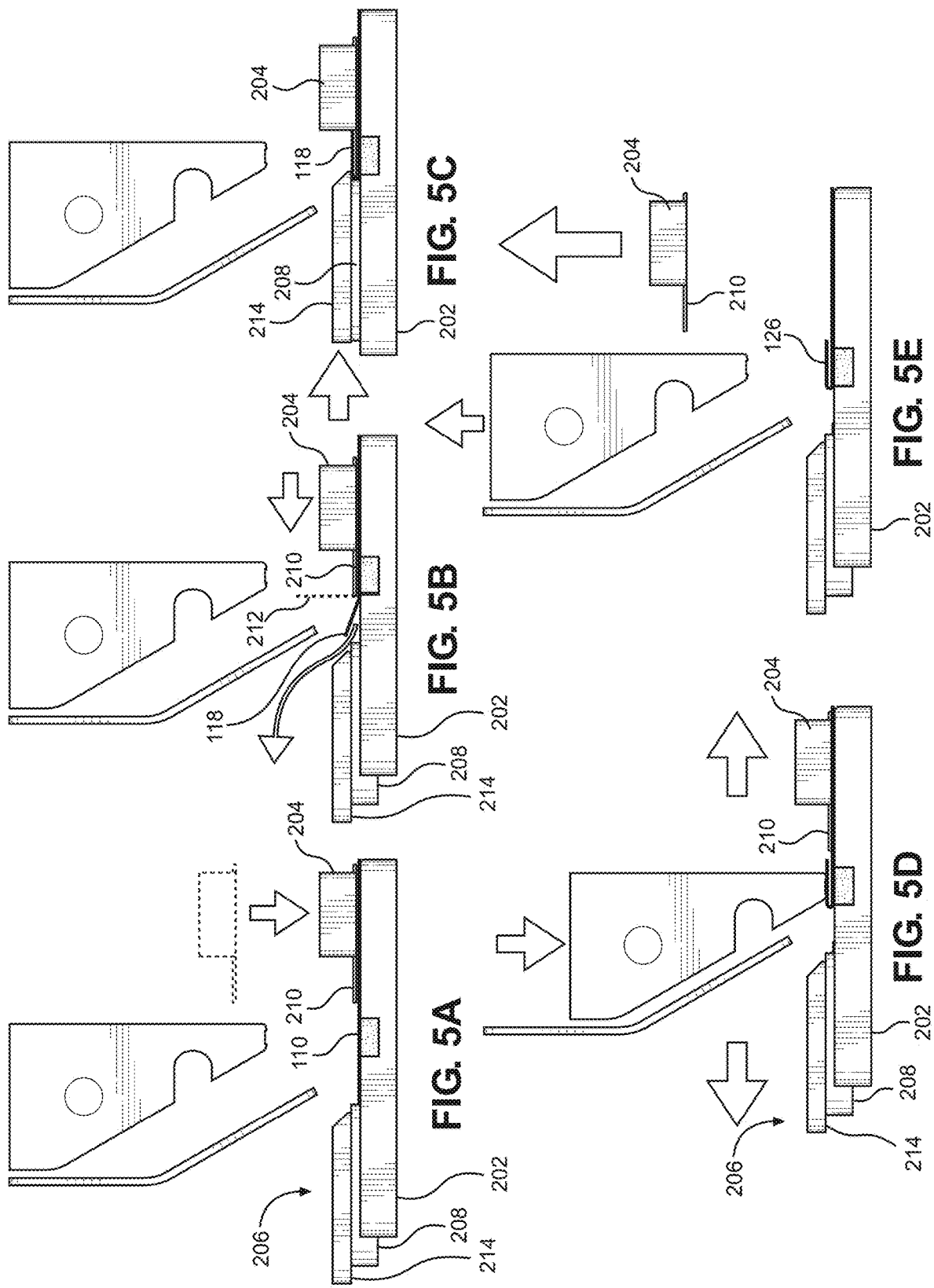
FIGS. 5A-E illustrate an exemplary method of forming the tack weld of FIGS. 1 and 2A-D with the tack welding system of FIG. 4.

FIG. 4 illustrates a tack welding system 200 configured to form the tack weld 126 on the film 110, and FIGS. 5A-E illustrate a process of forming the tack weld 126 with the tack welding system 200. As illustrated in FIGS. 4 and 5A, the film 110 may be fed as a substantially flat sheet along a support 202 such as a support table and into the tack welding system 200 under a shoe member 204, until the first edge 118 is in abutment with a lower camming surface 208 of a fold member 206. In some embodiments, a short edge of the sheet of film 110 may be fed into the tack welding system 200 to form the tack weld 126 on the short edge, as illustrated in FIG. 4. However, in other embodiments, a long edge may be fed into the tack welding system 200 to form the tack weld 126 on the long edge, as further discussed below in a continuous web roll design. In either configuration, a hold down fixture (not shown) may include a silicone strip that holds the film 110 down and allows movement of the shoe member 204. Therefore, the shoe member 204 may be a free floating fold guide, positioned very close to the film 110. The shoe member 204 may then be lowered onto the film 110 through actuation of a shoe cylinder (not shown), which may be pneumatic or hydraulic.

As illustrated in FIG. 5B, the shoe member 204 may be advanced along the film 110 and the support 202 until an end of a lip 210 of the shoe member 204 is aligned with a crease line 212. The shoe member 204 may be lowered against the film 110 and hold the film 110 down against the support 202. The tack welding system 200 may then blow air up through holes (not shown) of the support 202 to vertically deflect the first edge 118 of the film 110.

As illustrated in FIG. 5C, the fold member 206 may be advanced toward the crease line 212 through actuation of a fold cylinder (not shown), which may be pneumatic or hydraulic. Advancement of the fold member 206 may cause the lower camming surface 208 to sandwiched a portion of the film 110 between the lower camming surface 208 and the lip 210, where the first edge 118 of the film 110 extends substantially vertically along the crease line 212. The air may be stopped after the lower camming surface 208 contacts and supports the deflected first edge 118. An upper camming surface 214 of the fold member 206 may then be further advanced relative to the lower camming surface 208 and over the lip 210 to fold the first edge 118 over the lip 210 of the shoe member 204. The upper camming surface 214 may be advanced through actuation of the same or separate (pneumatic or hydraulic) cylinders as the lower camming surface 208. Once the film 110 is folded, the first outer portion 122 and the second outer portion 124 of the first edge 118 may be in apposition.

As illustrated in FIG. 5D, a weld member 216 may be lowered toward the folded first edge 118. The weld member 216 may be lowered using low air electronics, and a pop of air may be used to break hysteresis. A low air regulator may hold the weld member 216 firmly in place spaced from the film 110, while the shoe member 204 and the fold member 206 may be retracted from the crease line 212 out of the way of the weld member 216. The shoe member 204 and the fold member 206 may each be retracted through removal of air from respective pneumatic cylinders and retraction of one or more extended springs. The tack welding system 200 may initiate a seal cycle of the weld member 216 prior to contacting the weld member 216 with the film 110. The weld member 216 may then be further lowered to contact the first edge 118 and apply heat and pressure to the folded first edge 118 to generate the tack weld 126. The weld member 216 may extend substantially the entire length of the film 110 to create the tack weld 126 along substantially the entire length of the first edge 118 of the film 110.

As illustrated in FIG. 5E, the tack welding system 200 may then raise the shoe member 204 and the weld member 216 from the film 110 and the support 202. The film 110 may be cut from the sheet at the tack welding system 200, and the film 110 may be removed from the tack welding system 200. For example, a cutting fixture (not shown) may be positioned at an end of the support 202 configured to cut the sheet of film 110 as the sheet of film 110 is held down on the support 202. The tack welding system 200 may then be prepared to process additional films from the same sheet or a separate sheet. The tack welding system 200 may also include a non-stick sheet 218 (e.g., Teflon coated) that prevents the film 110 from sticking. It is readily understood that the size and components of the tack welding system 200 may vary depending on the size of the tack weld 126. For example, the size of the components of the tack welding system 200 may be larger for embodiments when the long edge of the sheet of film 110 is fed into the tack welding system 200 to form the tack weld 126 on the long edge.

Figure 6:
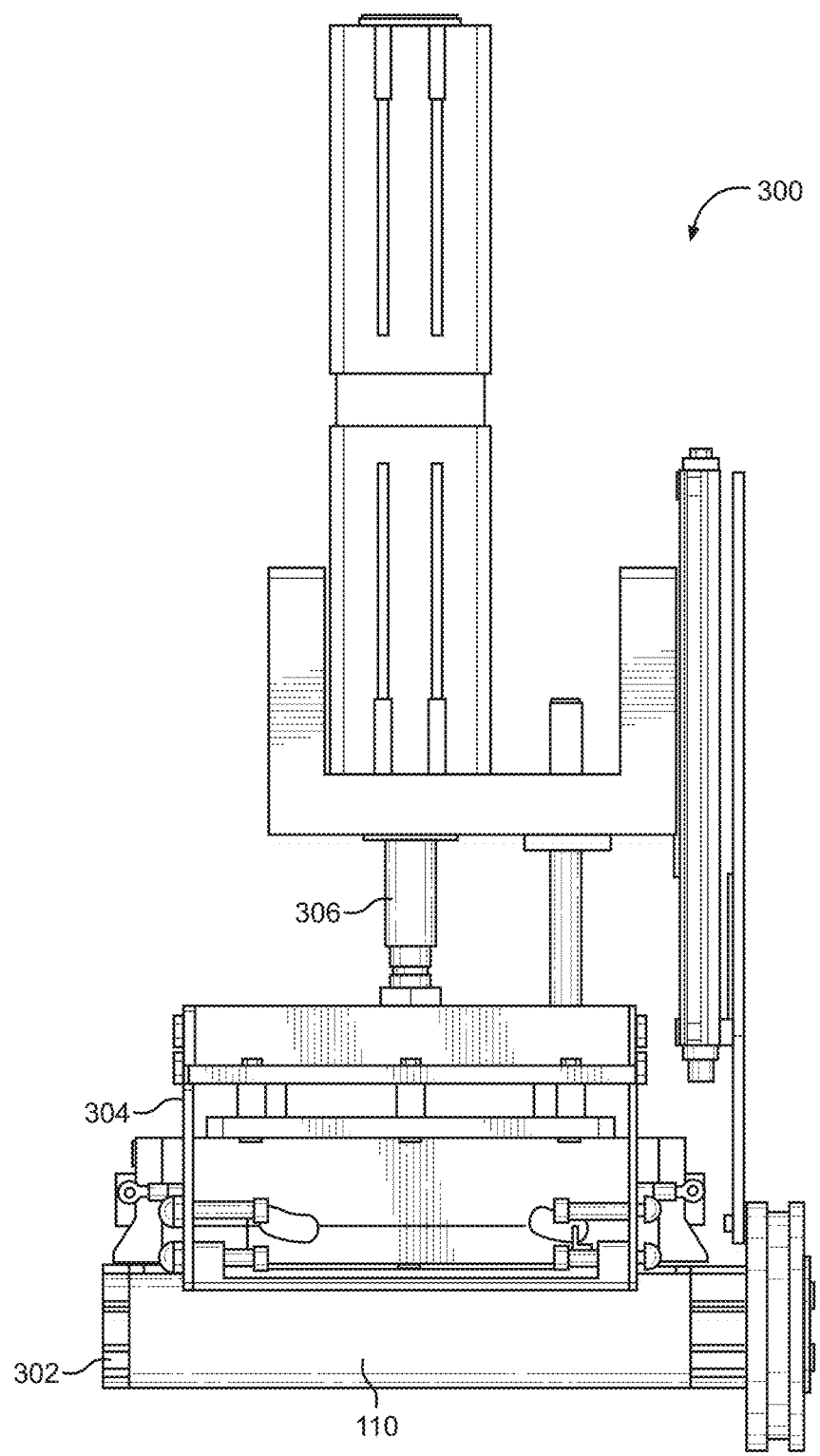
FIG. 6 illustrates an exemplary fin sealing system configured to form the fin seal of FIGS. 1 and 2C-D.

FIG. 6 illustrates a fin sealing system 300 configured to form the fin seal 134 on the film 110. As illustrated, the fin sealing system 300 may include the mandrel 302 and an impulse welder 304. The film 110 may be wrapped or mounted on the mandrel 302 after tack welding and the film 110 is cut from the sheet. The second edge 120 may overlap the first edge 118 when mounted on the mandrel 302, as illustrated in FIGS. 2C-D. The second inner portion 132 of the second edge 120 may overlay the first inner portion 130 of the first edge 118 exposed with the tack weld 126, as further illustrated in FIG. 2C-D. The mandrel 302 may then be positioned or secured underneath the impulse welder 304. The impulse welder 304 may be lowered onto the first and second edges 118, 120, for example, through an actuator 306, which may be pneumatic or hydraulic. The actuator 306 may apply pressure to the first and second edges 118, 120 to press the inner portions 130, 132 together. The impulse welder 304 may also apply heat to weld the inner portions 130, 132 together with a fin seal 134, creating the tack welded fin seal 112 and/or forming a tube of the film 110.

In some embodiments (not shown), the tack welded fin seal may be formed from a continuous web roll design. For example, the tack weld 126 may be formed along a long edge of the sheet of film 110 (e.g., extending the whole length of the sheet of film 110), instead of forming the tack weld 126 on a short edge as illustrated in FIG. 4. Thus, the tack weld 126 may extend the length (long edge) of the sheet of film 110. Prior to cutting the sheet of film 110, opposing long edges of the sheet of film 110 may be wrapped around the mandrel 302, such that the untacked long edge may overlay the tacked long edge, as similarly illustrated in FIG. 2C. The impulse welder 304 may then create the fin seal 134 to form the tack welded fin seal 112, as similarly depicted in FIGS. 2D and 6. The tube of film 110 may then be cut to size after the tack welded fin seal 112 is formed. Forming the tack weld 126 on the long edge of the film 110 and cutting the tube of film 110 after forming the tack welded fin seal 112 may increase manufacturing speeds. The length of the tube of film 110 after forming the tack welded fin seal 112 may also be sized to be cut into two or more containers 100, which may reduce waste and facilitate mass production. After the tube of film 110 is cut down to size, the faceplate 140 may then be molded on the first end of the film 110 (as illustrated in FIG. 7), and the gusset seal 160 may be formed on the second of the film 110 (as illustrated in FIG. 1).

Figure 7:
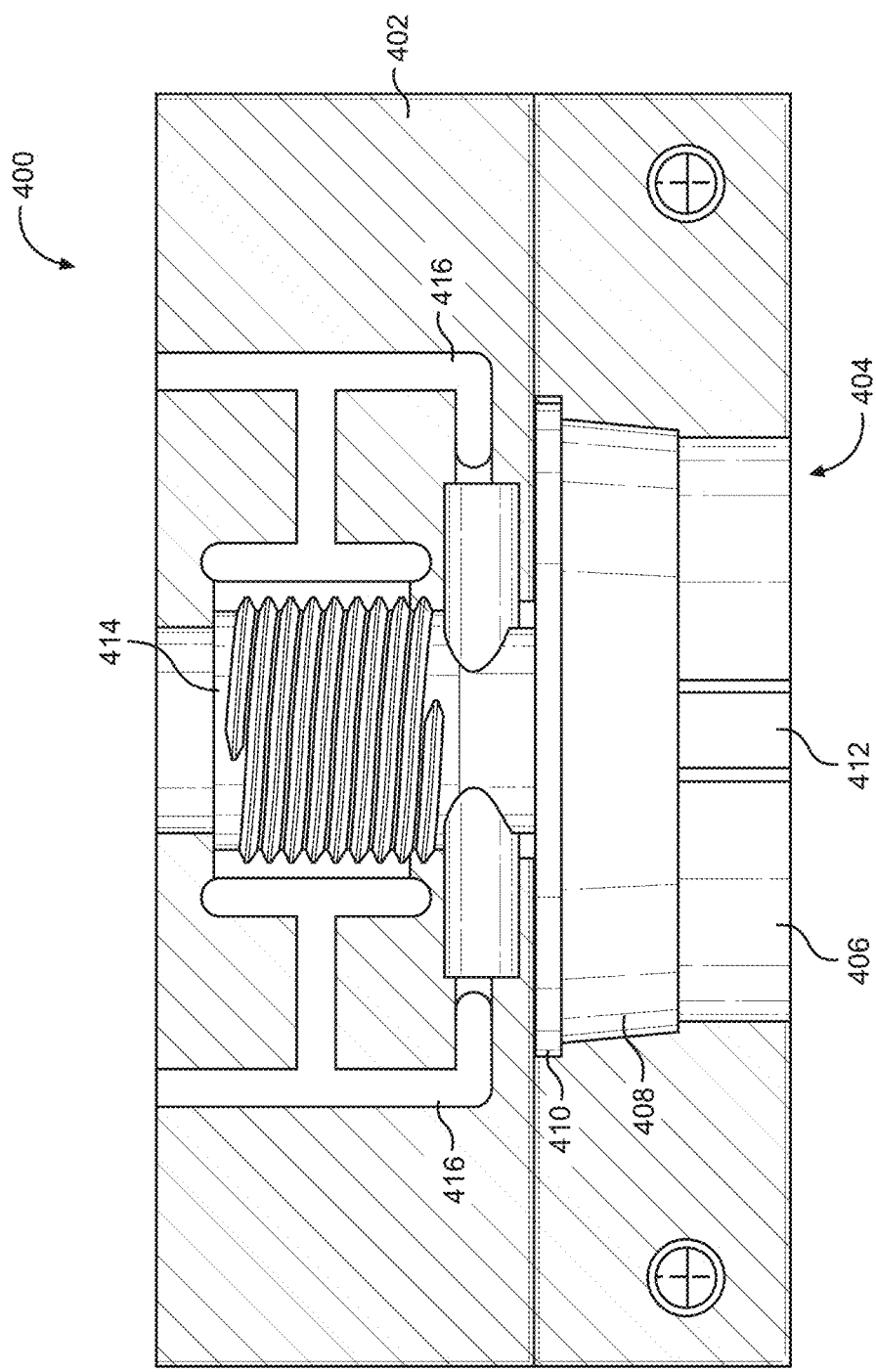
FIG. 7 illustrates an exemplary faceplate molding system configured to form the molded faceplate of FIGS. 1 and 3A-B.

FIG. 7 illustrates a faceplate molding system 400 comprising a mold 402 configured to form the molded faceplate 140. The film 110 may be mounted on a mandrel, and the film 110 and the mandrel may be inserted into a cavity 404 of the mold 402. The cavity 404 may include a first portion 406 having a generally cylindrical shape, a second portion 408 having a generally tapered shape, and a third portion 410 having a generally cylindrical shape. The mandrel may be inserted into the cavity 404, such that the film 110 may extend into at least one of the first, second, and third portions 406-410 of the mold 402. The first portion 406 may engage and apply pressure to the outer surface of the film 110. As further illustrated, the first portion 406 may include a relief 412 having an increased width, for example, larger than the remaining first portion 406. The relief 412 may be configured to receive and apply pressure to the tack welded fin seal 112, preventing the resin from flashing down the film 110, causing breakage of the film 110. The relief 412 may also prevent excessive pressure being applied at the tack welded fin seal 112, creating a pressure concentration and/or an internal protrusion of the container 100. The cavity 404 may further include a nosepiece portion 414 at a proximal end of the mold 402 being configured to form the nosepiece 142 of the container 100.

The mold 402 may include a gate at a tip of the nozzle flat (not illustrated) configured to introduce molten resin into the cavity 404 and venting channels 416 extending into the cavity 404. The resin may be the same or substantially the same composition as the outer surface of the film. The molten resin may cause the outer surface of the film 110 to melt and intermix with the molten resin at an interface. The faceplate 140 and the outer layer of the film 110 may then solidify to form an integrated structure of essentially uniform composition having no distinct layers at the interface. The faceplate 140 may be molded to the circumference of the film 110, including the tack welded fin seal 112. The tack welded fin seal 112 may prevent separation of the first and second edges 118, 120 of the film and/or delamination of the film 110 during and after the molding. The first, second, and third portions 406-410 may be any cross-section depending on the desired shape of the film 110 and the faceplate 140.

Figure 8:
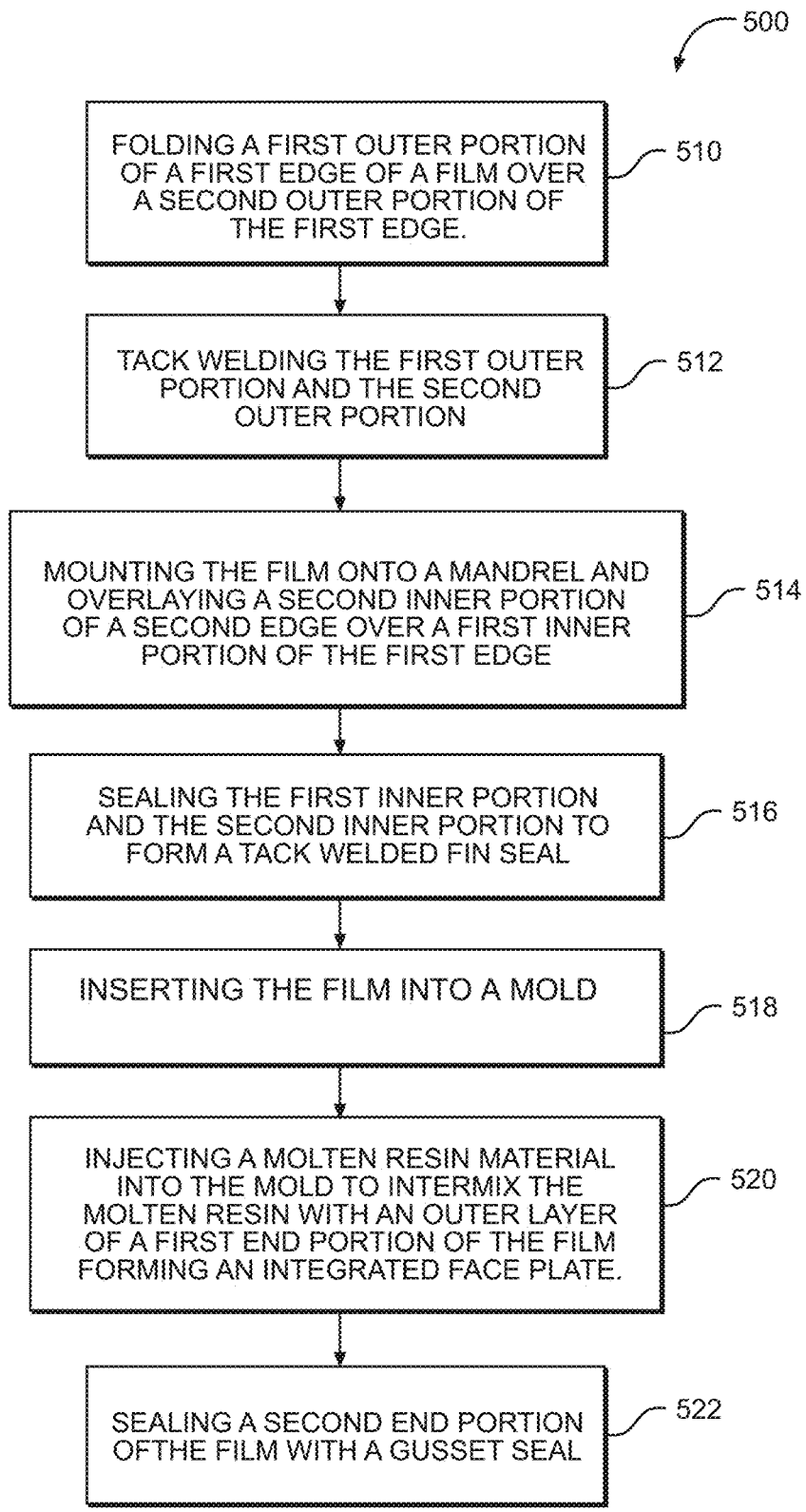
FIG. 8 illustrates an exemplary method of forming the container of FIG. 1.

FIG. 8 illustrates a method 500 of producing the container 100. Step 510 may include folding the first outer portion 122 of the first end portion 114 of the film 110 over a second outer portion 124 of the first end portion 114, as illustrated in FIGS. 2A-B. Step 512 may include tack welding the first outer portion 122 and the second outer portion 124, as illustrated in FIG. 2B. Steps 510, 512 may be performed at the tack welding system 200, as illustrated in FIGS. 5A-E. The film 110 may then be cut from a sheet after the tack welding.

Step 514 may include mounting or wrapping the film 110 onto the mandrel 302 and overlaying the second inner portion 132 of a second edge 120 over the first inner portion 130 of the first edge 118, as illustrated in FIGS. 2C-D. Step 516 may include sealing the first inner portion 130 and the second inner portion, as illustrated in FIG. 2D. Steps 514, 516 may be performed at the fin sealing system 300 with the impulse welder 304, for example, as illustrated in FIG. 6. The film 110 may be loaded onto a tombstone mandrel one by one from the fin sealing system 300 and may deliver in sets of four to one or more robot mandrels. The robot mandrels may then be delivered in sets of eight sleeves to collapsible cores in the molds 402 for molding.

Step 518 may include inserting the sleeves of film 110 into the mold 402. Step 520 may include injecting a molten resin material into the mold to intermix the molten resin with an outer surface of the first end portion 114 of the film 110 (including the tack welded fin seal 112) and to form an integrated faceplate 140. Steps 518, 520 may be performed with the mold 402, as illustrated in FIG. 7. The mandrel and the film 110 may be removed from the mold 402. The film 110 may then be removed from the mandrel.

Step 522 may include sealing the second end portion 116 of the film 110 with a gusset seal 160. The gusset seal 160 may benefit from the tack welded fin seal 112 providing a flat structure of film 110 to weld. The three layered structure of the tack welded fin seal 112 would not interfere with the welding surfaces. In contrast, a non-tack welded fin seal would cause varying results of the sealing depending on how the fin stands or lays, and may prevent a seal all together. The container may then be filled with an epoxy or an adhesive.

Figure 9:
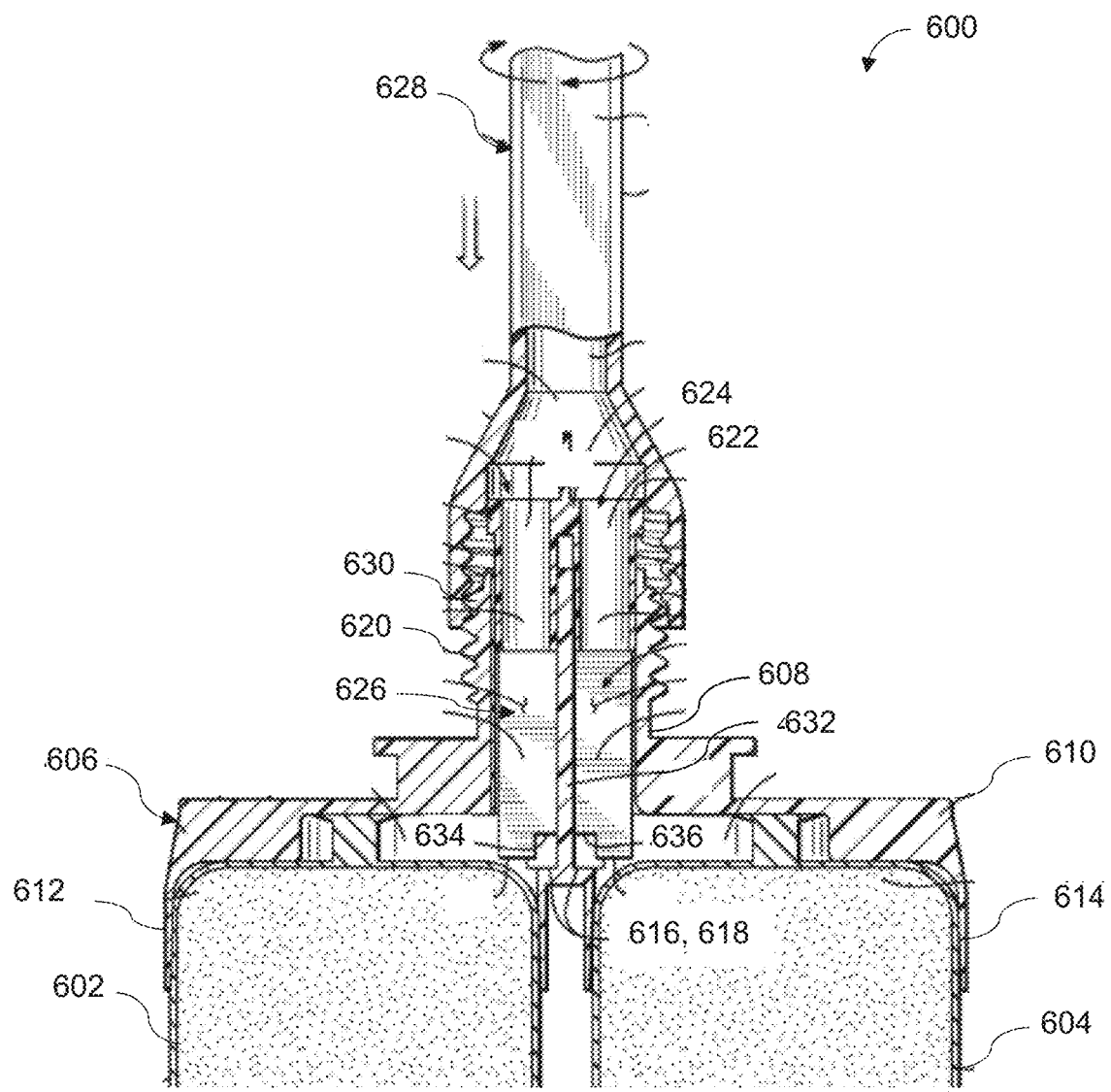
FIG. 9 illustrates a view of another exemplary container in accordance with aspects of the invention.

FIG. 9 illustrates a faceplate 606 of another exemplary container 600. The exemplary container 600 may include two flexible bags 602, 604 (referred to herein as "sausage pack bags"). Though the exemplary container 600 includes two flexible sausage pack bags 602, 604, the present invention is not limited to two flexible sausage pack bags 602, 604 and may instead include only one sausage pack bag, or any suitable number of sausage pack bags required for a desired dispensing process. Any or both of the flexible sausage pack bags 602, 604 may be formed from the film 110, as described above.

The faceplate 606 may have a neck 608 and a cap section 610. The cap section 610 may include a first opening 612 and a second opening 614 that may receive and be coupled to the two flexible sausage pack bags 602, 604. The cap section 610 may further include a first shoulder 616 and a second shoulder 618. The first shoulder 616 and the second shoulder 618 may be positioned adjacent to the first opening 612 and the second opening 614, respectively. The neck 608 may include a threaded portion 620, an outlet 622, and/or a passageway 624. The passageway 624 may extend from the outlet 622 through the threaded portion 620, and to the first opening 612 and the second opening 614 such that the passageway 624 is in fluid communication with the cap section 610. The container 600 may further include a piercer 626 that may slide within the passageway 624 of the neck 608 to pierce the two sausage pack bags 602, 604.

The container 600 may further include a nozzle 628 that may have a threaded portion 630 that may engage with the threaded portion 620 of the neck 608 of the faceplate 606. The neck 608 of the faceplate 606 may include a partition 632 that may extend through the passageway 624 from the outlet 622 to the first shoulder 616 and the second shoulder 618 of the cap section 610. The piercer 626 may include a first step 634 and a second step 636 that may engage with the first shoulder 616 and the second shoulder 618, respectively, to limit sliding of the piercer 626 within the passageway 624. The nozzle 628 may engage the piercer 626 to cause the piercer 626 to slide within the passageway 624 of the neck 608 to pierce the two flexible sausage pack bags 602, 604 and therefore allow material disposed therein to flow through the passageway 624 and out the outlet 622 for dispensing though the nozzle 628. The nozzle 628 may cause the first step 634 and the second step 636 of the piercer 626 to be brought into respective engagement with the first shoulder 616 and the second shoulder 418 to terminate the sliding of the piercer 626 within the passageway 624.

The faceplate 606 may be molded to the circumference of the film 110 (e.g., that the flexible sausage pack bags 602, 604 are formed of), including the tack welded fin seal 112. The tack welded fin seal 112 without the tack weld 126 may be difficult to mold due a potential separation of the first and second edges 118, 120. The first and second edges 118, 120 may also separate after molding, potentially causing failure of the faceplate 140.

One or more of software modules incorporating the methods described above can be integrated into a computer system or non-transitory computer-readable media. Moreover, while illustrative embodiments have been described herein, the scope includes any and all embodiments having equivalent elements, modifications, omissions, combinations (e.g., of aspects across various embodiments), adaptations or alterations based on the present disclosure. Further, the steps of the disclosed methods can be modified in any manner, including by reordering steps or inserting or deleting steps.

What is claimed is:

1. A container comprising:
   a film comprising a first edge and a second edge;
   a tack weld joining a first outer portion of the first edge and a second outer portion of the first edge; and
   a fin seal joining a first inner portion of the first edge of the film and a second inner portion of the second edge.

2. The container of claim 1, wherein the tack weld extends substantially the entire length of the fin seal.

3. The container of claim 1, further comprising a faceplate integrally molded to an outer layer of a first end portion of the film, the faceplate comprising a nosepiece having a discharge opening.

4. The container of claim 3, wherein the faceplate comprises substantially the same composition as the outer layer of the first end portion, such that there is no distinct layers between the faceplate and the film.

5. The container of claim 4, wherein the film further comprises a center layer and an inner layer, each of the inner layer and the outer layer comprises a polymer, the polymer of the outer layer being the same as a polymer of the faceplate.

6. The container of claim 5, wherein the polymer of the inner layer and the outer layer comprises polyethylene.

7. The container of claim 5, wherein the center layer comprises an aluminum foil.

8. The container of claim 1, further comprising a gusset seal on a second end portion of the film.

9. The container of claim 1, further comprising an adhesive or an epoxy stored within the film.

10. The container of claim 1, further comprising a faceplate that includes a neck and a cap section, wherein:
    the cap section comprises an opening configured to receive and be coupled to the film, and
    the neck comprises a passageway extending from the opening such that the passageway is in fluid communication with the cap section.

11. The container of claim 10, further comprising:

a piercer that is configured to slide within the passageway of the neck of the faceplate, the piercer is configured to pierce the film, wherein:

the neck of the faceplate further includes a partition that extends through the passageway, the piercer includes at least one step to limit sliding of the piercer within the passageway, and a nozzle is configured to engage the piercer and to cause the piercer to slide within the passageway of the neck to pierce the film.

12. A container, comprising:

a film having an inner layer, a center layer, and an outer layer, each of the inner layer and the outer layer comprising a polymer, and the center layer comprising a metal;

a tack weld joining a first outer portion of a first edge of the film and a second outer portion of the first edge;

a fin seal joining an inner portion of the first edge and an inner portion of a second edge of the film, wherein the tack weld extends substantially the entire length of the fin seal;

a faceplate integrally molded to the outer layer of a first end portion of the film, the faceplate comprises substantially the same composition as the outer layer of the first end portion, such that the outer layer and the faceplate form an integrated structure of essentially uniform composition having no distinct layers at a conjoined region of the integrated structure, the faceplate comprising a nosepiece having a discharge opening;

a gusset seal on a second end portion of the film; and an adhesive or an epoxy stored within the film.

13. The container of claim 12, wherein the polymer of the inner layer and the outer layer comprises polyethylene.

14. The container of claim 12, wherein the metal of the center layer is aluminum.

* * * * *